United States Patent [19]
Drost et al.

[11] Patent Number: 6,076,175
[45] Date of Patent: Jun. 13, 2000

[54] CONTROLLED PHASE NOISE GENERATION METHOD FOR ENHANCED TESTABILITY OF CLOCK AND DATA GENERATOR AND RECOVERY CIRCUITS

[75] Inventors: Robert J. Drost, Palo Alto; Robert J. Bosnyak, San Jose, both of Calif.

[73] Assignee: Sun Microsystems, Inc., Palo Alto, Calif.

[21] Appl. No.: 08/828,505

[22] Filed: Mar. 31, 1997

[51] Int. Cl.[7] .................................................. G06F 11/00
[52] U.S. Cl. ......................... 714/704; 714/814; 714/815
[58] Field of Search .................... 371/5.1, 61; 324/158.1; 714/704, 814, 815

[56] References Cited

U.S. PATENT DOCUMENTS

| | | |
|---|---|---|
| 3,916,329 | 10/1975 | Hekimian et al. . |
| 4,697,140 | 9/1987 | Saito et al. . |
| 5,357,195 | 10/1994 | Gasbarro et al. ...................... 324/158.1 |
| 5,410,570 | 4/1995 | Ladha et al. ............................ 375/367 |
| 5,446,914 | 8/1995 | Paul et al. . |
| 5,481,563 | 1/1996 | Hamre . |
| 5,515,404 | 5/1996 | Pearce . |

*Primary Examiner*—Phung M. Chung
*Attorney, Agent, or Firm*—Finnegan, Henderson, Farabow, Garrett & Dunner, L.L.P.

[57] ABSTRACT

A transmitter/receiver chip includes circuitry for testing the bit error rate of the chip. A controlled amount of noise is introduced to the chip to vary a timing parameter of a transmit clock, resulting in an increase in a bit error rate of the chip. Artificially increasing the bit error rate of the chip reduces the amount of time required to test the chip to determine the acceptability of the chip and its actual bit error rate.

45 Claims, 8 Drawing Sheets

CONTROLLED PHASE NOISE GENERATION METHOD FOR ENHANCED TESTABILITY OF CLOCK AND DATA GENERATOR AND RECOVERY CIRCUITS

BACKGROUND OF THE INVENTION

The present invention relates generally to the field of data communication, and more particularly to the field of testing to verify that the bit error rate of a chip in a data communication system is acceptable.

Transmitter/receiver (Tx/Rx) chips transmit and receive digital data. Systems that use Ethernet, Fiber Channel, ATM, and other data communication standards that transmit bits serially through a single pair of wires often incorporate these chips. The Tx/Rx chips often include analog blocks to provide functions such as clock multiplication and clock recovery that cannot be performed fast enough digitally. The analog blocks introduce jitter, however, which can increase the bit error rate (BER), the number of errors per bits transmitted.

FIG. 1 shows an example of a transmitted data stream with jitter. Ideally, the receiver circuit will sample the received data in the middle of each bit position because the signal is most stable at this point. The clocks used for sampling predict the middle of the bit position from edges (or level transitions) of previously-received data. Jitter in the data stream, however, can move edges of the signal and fool the clock into sampling the data stream either too soon or too late, causing errors in the recovered data stream.

For example, during period C of FIG. 1, an edge in the recovered data stream occurs before the corresponding edge of the transmitted data stream, resulting in jitter represented by $-\Delta t_1$. The opposite situation arises in period F where the edge in the recovered data stream occurs after the corresponding edge of the transmitted data stream by an amount represented by $\Delta t_2$.

FIG. 1 also shows a situation where the jitter has caused a bit error. In period G, as in period F, the edge in the recovered data stream occurs after the corresponding edge of the transmitted data stream by an amount represented by $\Delta t_3$. The amount $\Delta t_3$ is great enough to push the rising edge in the recovered data stream past period G. As a result, the bit level is one in the transmitted data stream, but remains zero in the recovered data stream, resulting in an error.

Bit errors produce problems for modern data communication systems that require high reliability at high speeds and without a high cost. The high reliability generally requires extensive testing of chips, but the need to keep the cost low constrains the testing to a short time period with low frequency equipment. As test times increase, so does the cost of testing. Also, equipment for testing at high frequencies is more expensive then equipment for testing at low frequencies.

Certain conventional tests ensure that the final IC package works properly when assembled on a circuit board, such as an Ethernet board, and confirms that the physical wiring on the board is working correctly. This process does not test the analog blocks separately nor stress the chips to see the extremes at which it can operate, however, and such limitations may not result in a fully tested product.

Another method for determining reliability tests the chips only long enough to provide significant indications of the chip's performance. Modern bit error rate requirements, however, may demand over an hour of testing for each chip. For instance, a system with a bit error rate of $10^{-12}$ errors per bit or less for a system bit rate of 1 Gbit/s would only generate 3.6 errors per hour. This testing time exceeds the time available to test the chip. Avoiding this expense requires a testing system that can, in a short period of time, reliably verify the bit error rate of a chip in a data communication system.

SUMMARY OF THE INVENTION

To reduce the cost of testing and increase the reliability, processes and systems in accordance with this invention stress the chips using on-chip circuitry, such as by varying the jitter to measure the bit error rate of the chip. This testing can take a relatively short period of available time, and thus be used during testing at wafer sort, and can employ inexpensive digital wafer probe testers that cause additional analog circuitry in the transmitter of the chip to generate a data stream with artificially-created jitter.

To obtain the advantages and in accordance with the purpose of the invention, as embodied and broadly described herein, an integrated circuit capable of determining an error rate during testing includes a clock generator generating clock signals; a variance circuit, coupled to the clock generator, to controllably vary a timing parameter of the clock signals; and a transmitter circuit, coupled to the clock generator, configured to generate output data using the clock signals.

Both the foregoing general description and the following detailed description provide examples and explanations only. They do not, however, restrict the claimed invention.

DESCRIPTION OF THE DRAWINGS

The accompanying drawings, which are incorporated in and constitute a part of this specification, illustrate embodiments of the invention and, together with the description, explain the advantages and principles of the invention. In the drawings.

DESCRIPTION OF THE PREFERRED EMBODIMENT

Figure 1:
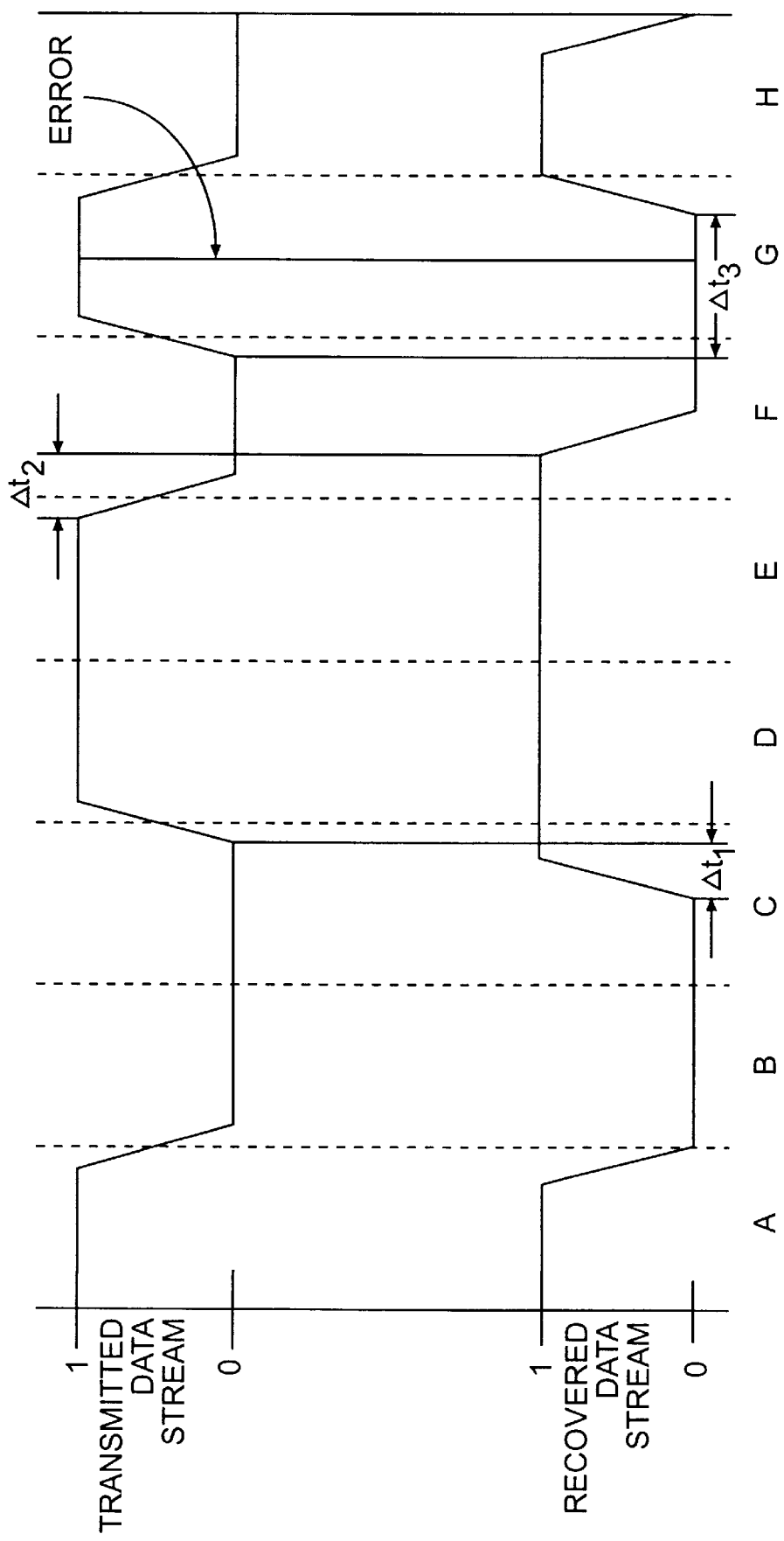
FIG. 1 is a timing diagram of a transmitted data stream and a corresponding recovered data stream.

Reference will now be made to preferred embodiments of this invention, examples of which are shown in the accompanying drawings and will be obvious from the description of the invention. In the drawings, the same reference numbers represent the same or similar elements in the different drawings whenever possible.

Figure 2:
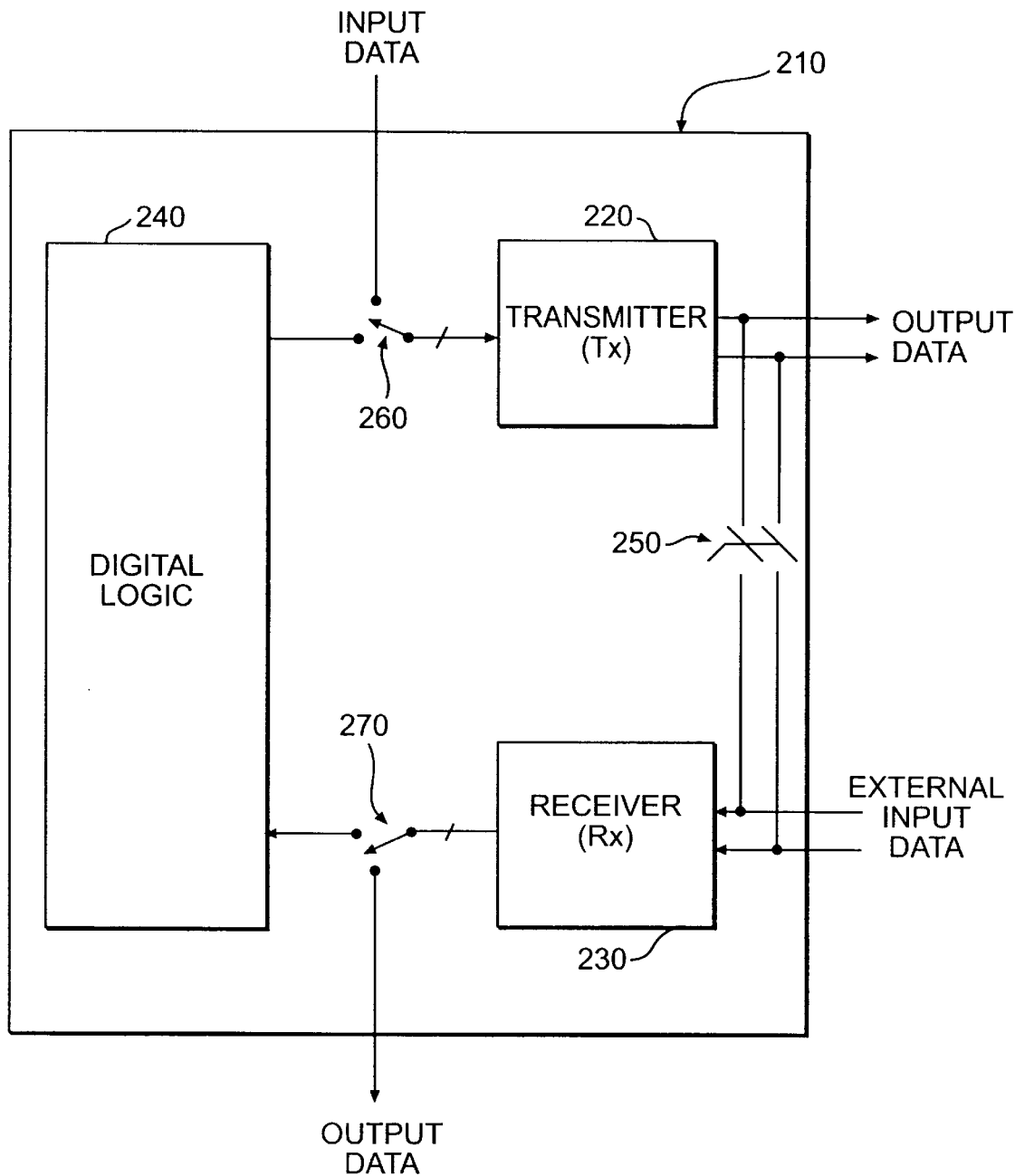
FIG. 2 is a block diagram of a transceiver/receiver integrated circuit chip according to the present invention.

FIG. 2 shows a block diagram of a Tx/Rx IC chip 210 according to the present invention. Chip 210 includes a transmitter circuit 220, a receiver circuit 230, digital logic 240, a loop back circuit 250, and switches 260 and 270.

Switches 260 and 270 selectively couple digital logic 240 to transmitter circuit 220 and receiver circuit 230, respectively. Switches 260 and 270 can also couple transmitter circuit 220 and receiver circuit 230 to additional circuitry. This circuitry may be some combination of on-chip and off-chip components that allow the enhanced testability and is described below. Loop back circuit 250 selectively couples a pair of serial output data lines of transmitter circuit 220 to a pair of serial input data lines of receiver circuit 230 for looping back the output signals of chip 210 from its transmitter to its receiver. As shown, loop back circuit 250 includes a pair of switches for coupling the pair of serial data lines. Receiver circuit 230 can also receive data from an external source, such as other chips and devices, when loop back circuit 250 does not couple the output of transmitter circuit 220 to the input of receiver circuit 230.

Figure 3:
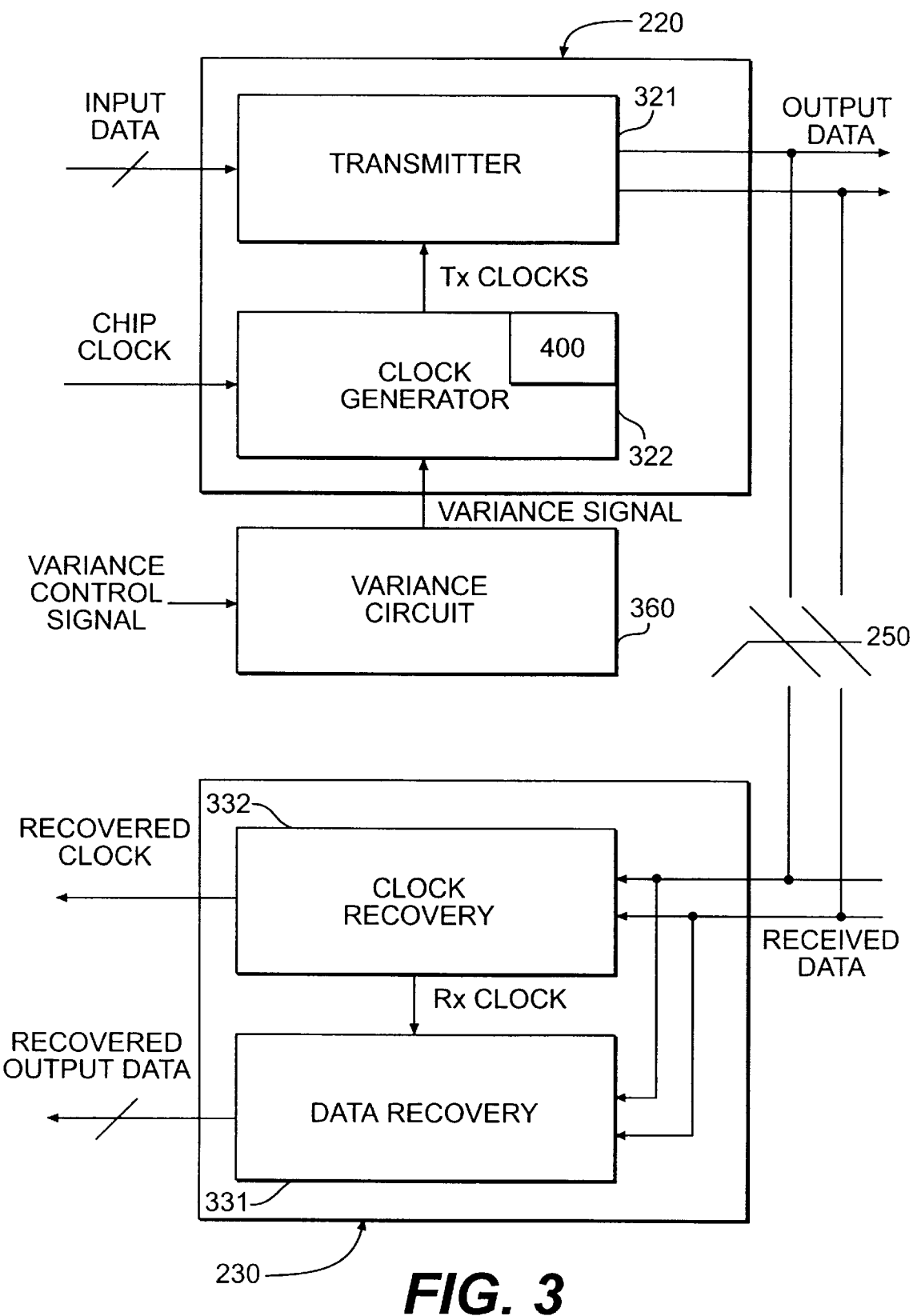
FIG. 3 is a diagram of the transceiver and receiver circuits of the IC chip of FIG. 2.

FIG. 3 shows a more detailed block diagram of the transmitter and receiver circuits. Transmitter circuit 220 preferably includes a transmitter 321 and a clock generator 322. Clock generator 322 includes a Phase Locked Loop (PLL) 400, shown in greater detail in FIG. 4. Receiver circuit 230 includes a data recovery circuit 331 and a clock recovery circuit 332. A jitter or variance circuit 360 is coupled to clock generator 322.

Clock generator 322 receives a chip clock signal and a jitter or variance signal and generates a transmit clock signal from these two signals. The chip clock signal is based on a signal that clocks the digital circuitry of chip 210 and, possibly, the digital circuitry of a circuit board incorporating chip 210. The variance signal from variance circuit 360 modulates a timing parameter, such as frequency or pulse width, of the transmit clock signal. Transmitter 321 receives input data from external circuitry, generally in parallel, and produces output data from that input data, generally in serial form.

Receiver circuit 230 selectively receives the output data from transmitter 321 by way of loop back circuit 250. Loop back circuit 250 affords a simple way of artificially testing chip 210 by transmitting the output data from transmitter circuit 220 directly to receiver circuit 230, thus eliminating the need for a separate device or chip to recover data from the output of transmitter 321.

Both data recovery circuit 331 and clock recovery circuit 332 receive the same data stream. Clock recovery circuit 332 produces a recovered clock signal from the data stream using known methods of detecting edges. Data recovery circuit 331 generates recovered output data, generally parallel data, based on the received data stream and the recovered clock signal.

Figure 4:
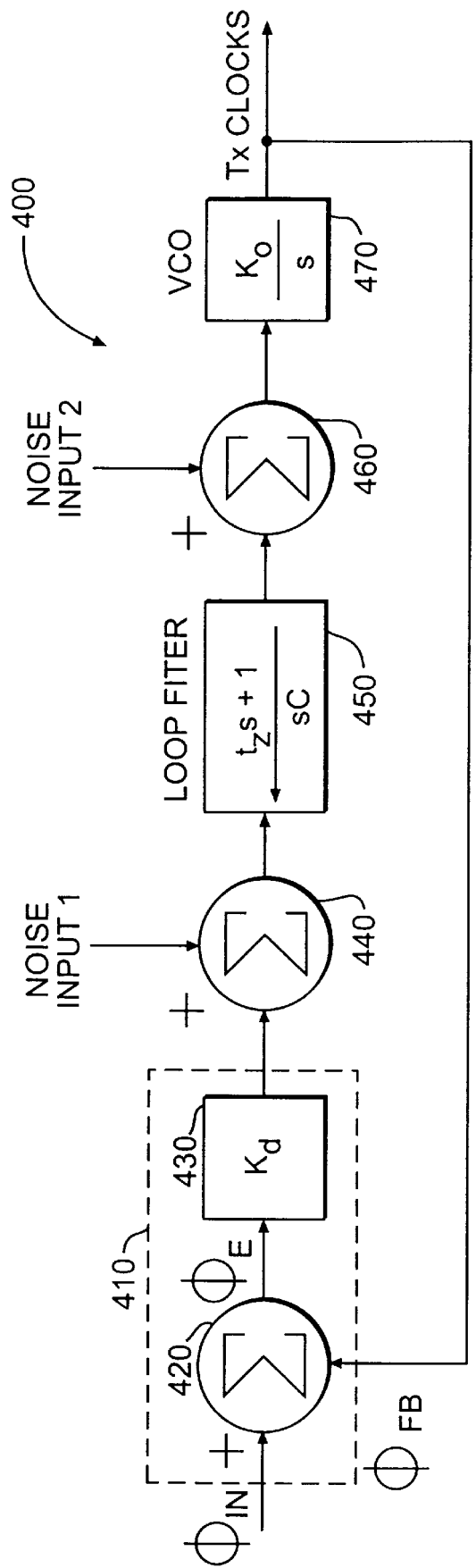
FIG. 4 is a diagram of the clock generator of the transceiver circuit of FIG. 2 implemented as a phase locked loop (PLL).

FIG. 4 shows an implementation of phase locked loop (PLL) 400 of clock generator 322. Alternatively, PLL 400 could be implemented as a delay locked loop (DLL), a frequency locked loop (FLL), or a combination of such circuits. PLL 400 preferably includes a phase detector 410, summers 440 and 460, a loop filter 450, and a voltage controlled oscillator (VCO) 470. Phase detector 410 preferably includes a subtractor 420 and a phase-to-current converter 430.

Subtractor 420 receives $\phi_{in}$, representing the phase of the chip clock signal, and $\phi_{FB}$, representing the phase of the feedback signal from VCO 470, and produces signal $\phi_e$, or phase error, representing their difference. Phase-to-current converter 430 converts $\phi_e$, into a current signal. In a different embodiment, a phase-to-voltage converter could produce an equivalent voltage signal.

Summer 440 adds the current signal from phase-to-current converter 430 to a signal from noise input 1, such as a noise current, $I_n$. Loop filter 450 filters the combined current signal produced by summer 440 using, for example, a series resistor/capacitor shunt circuit to produce a voltage signal.

Summer 460 adds the voltage from the output of loop filter 450 to a signal from noise input 2, such as a noise voltage, $V_n$, to produce a control voltage that VCO 470 converts into the transmit clock signal for transmitter 321 (FIG. 3). When VCO 470 receives a control voltage of zero volts, the generated signal frequency is equal to $\omega_{FR}$, the free running frequency of VCO 470. Otherwise, the generated signal frequency equals $\omega_{FR}$ plus the product of the control voltage and $K_O$, the gain of VCO. Thus, the frequency of the transmit clock signal generated by VCO 470 will increase or decrease linearly according to the value of the control voltage.

FIG. 4 shows PLL 400 receiving a noise signal at noise input 1 between phase-to-current inverter 430 and loop filter 450, and another noise signal at noise input 2 between loop filter 450 and VCO 470. In operation, either or both of these input noise sources could be used to inject noise into the transmit clock signal, or in other embodiments, current or voltage noise could be injected at other nodes within the loop of PLL 400. However, in the other embodiments, the design of loop filter 450, and possibly other parts of PLL 400, would have to be redesigned according to designs known to one of ordinary skill.

In PLL 400, the preferred transfer function for current noise $I_n$ to phase error $\phi_e$ is:

$$[-K_O(\tau_z s+1)]/[s^2 C + K_O K_D(\tau_z s+1)], \text{ and} \qquad (1)$$

the preferred transfer function for voltage noise $V_n$ is:

$$[-K_O s C]/[s^2 C + K_O K_D(\tau_z s+1)] \qquad (2).$$

In these equations, $K_D$ equals the gain of phase-to-current converter 430, $K_O$ equals the gain of VCO 470, $\tau_z$ equals the time constant of loop filter 450, and C is the loop filter capacitance 450.

Figure 5A:
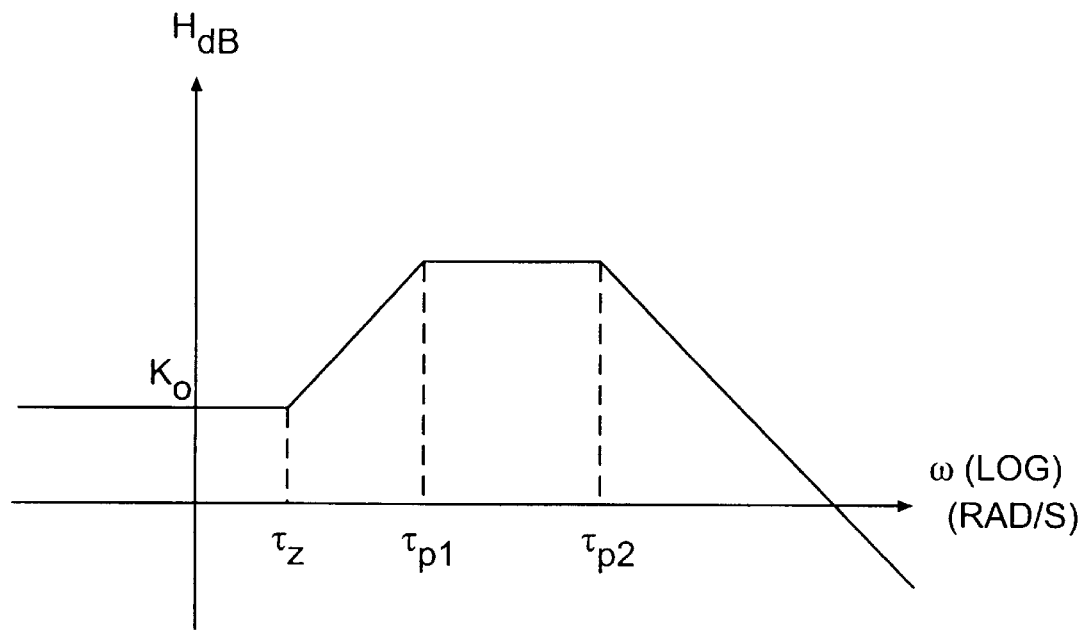
FIGS. 5A and 5B are bode plots for the transfer functions of variance signals injected into the PLL of FIG. 4.
Figure 5B:
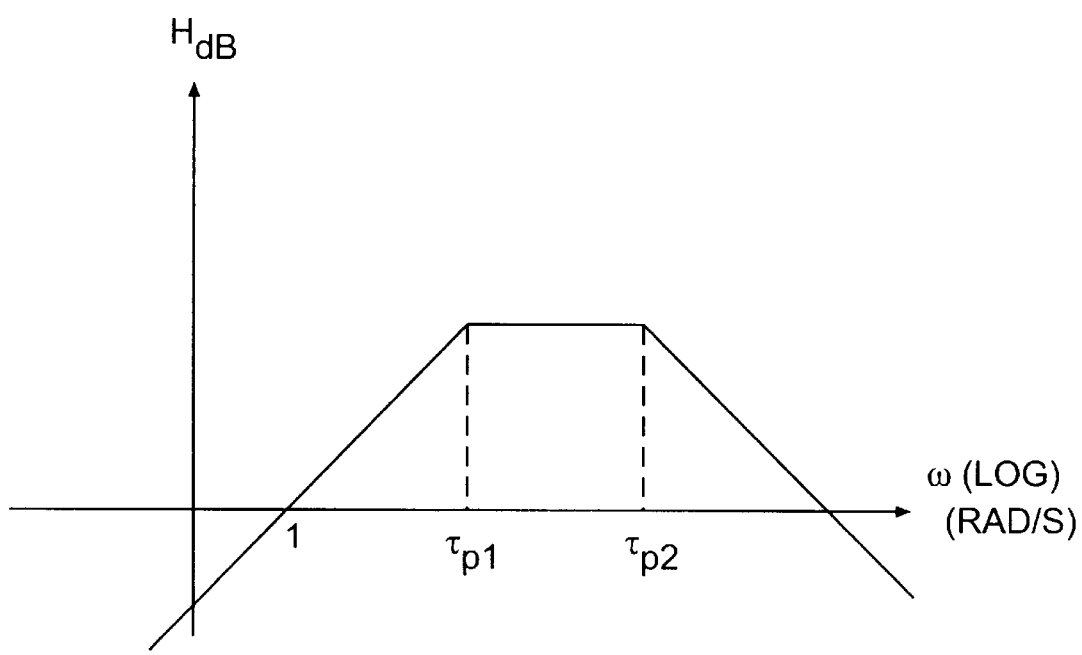

FIGS. 5A and 5B show the bode plots for the transfer functions embodied by equations (1) and (2), respectively. The bode plots give a visual representation of the effect of the noise inputs upon the phase error across a wide frequency spectrum. The numerator of equation (1) has a zero at $\tau_z$ causing a transition point at $\tau_z$ from the flat response produced by the constant $K_O$ value. The denominator of equation (1) has two poles determined by solving for the two roots of the quadratic equation in the denominator. The first pole, $\tau_{P1}$, causes the response to flatten, and the second pole, $\tau_{P2}$, causes the response to fall off at high frequencies. Thus, the plot as shown exhibits a good response at low frequencies, but falls off at higher frequencies.

The bode plot represented by FIG. 5B differs from that for FIG. 5A because, unlike equation (1), equation (2) has no constant value. Thus, the numerator is zero at zero frequency, and the output rises at 20 dB/decade through 1 rad/sec until the first pole, $\tau_{P2}$. The response then drops off at the second pole, $\tau_{P2}$. The lack of a constant value in the numerator means the voltage noise transfer function does not exhibit a good response at low frequencies. Also, similar to the plot of FIG. 5A, the response falls off at higher frequencies.

Figure 6:
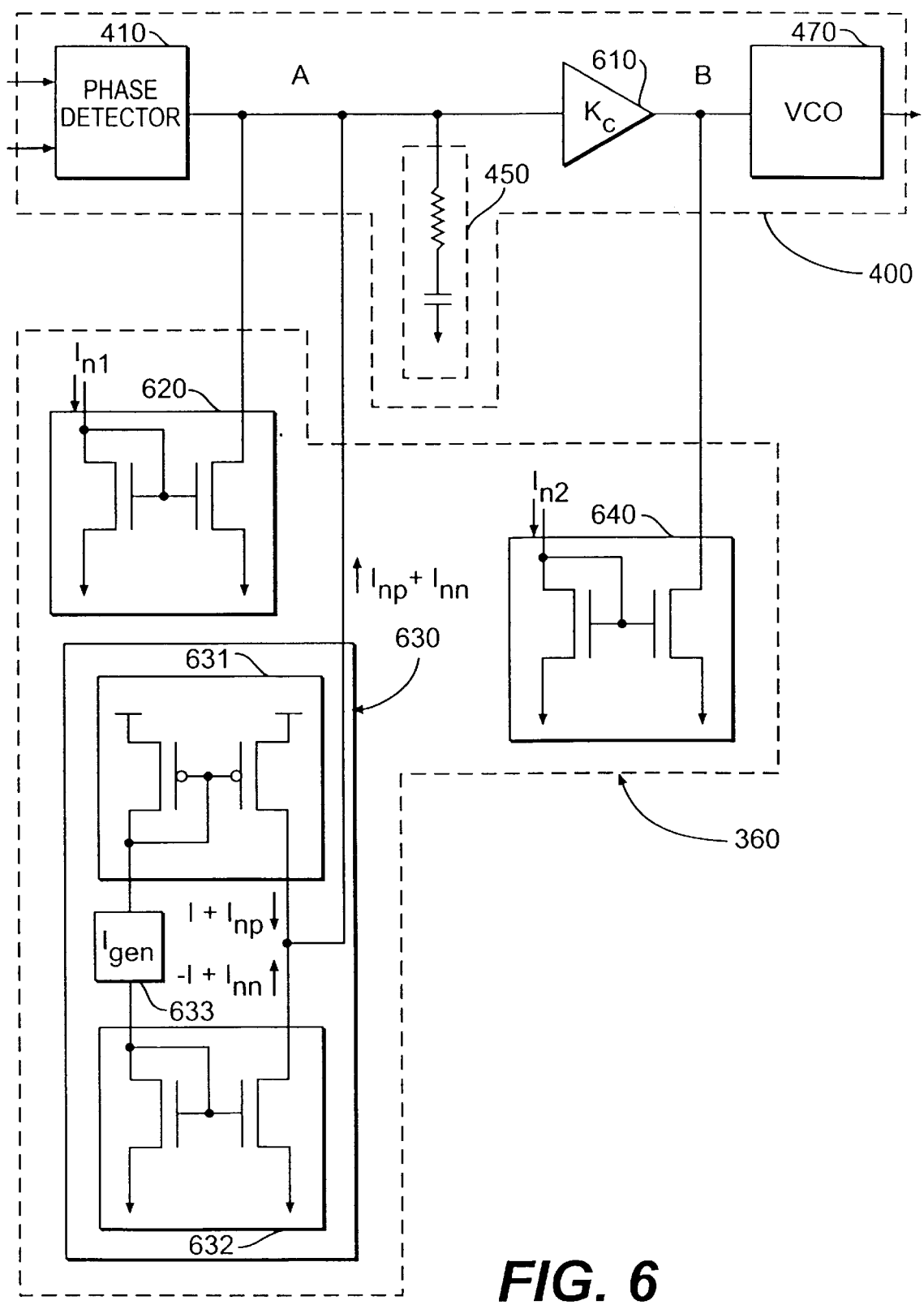
FIG. 6 is a diagram of the circuits implementing the variance circuit of FIG. 3.

FIG. 6 shows one implementation of PLL 400 and variance circuit 360. In this embodiment, variance circuit 360 includes a mirror noise generator 620, a gaussian noise generator 630, and another mirror noise generator 640. Loop filter 450 is shown as including a resistor and a capacitor coupled in series to ground. Mirror noise generators 620 and 640 introduce noise currents by varying the frequency, amplitude, and waveform of the respective input currents $I_{n1}$ and $I_{n2}$, and thus demonstrate the effect of jitter at that frequency on bit error rates.

Gaussian noise generator 630 includes a PMOS type current mirror 631, an NMOS type current mirror 632, and a current generator, $I_{gen}$, 633. Current generator 633 provides the input current to both current mirror 631 and current mirror 632. Each current mirror produces a current, I, in response to the input current from current generator 633, and a noise current according to the following relation:

$$_n{}^2 = 4\gamma\kappa T g do \qquad (3)$$

In equation (3), $\gamma$ represents a device parameter that depends on the doping of the substrate and typically equals $0.5\ V^{1/2}$, $\kappa$ represents Boltzmann's constant and equals $1.38 \times 10^{-23}$ joules/kelvin, T represents the temperature in degrees kelvin, and gdo represents the channel transconductance. Channel transconductance gdo is determined by the following relation:

$$gdo = [2Ids\mu_n C_{OX}(W/L)]^{1/2} \qquad (4).$$

In equation (4), Ids represents the drain to source current, $\mu_n$ represents the mobility of the electrons in the induced n-channel ($\mu_p$ for p-channel, approximately equal to one half $\mu_n$), Cox represents the capacitance per unit area of the gate to channel capacitor, W represents the width of the channel of the transistor, and L represents the length of the channel of the transistor.

As equations (3) and (4) show, the noise current generated by noise generator 630, given a constant temperature, fluctuates according to the value of channel transconductance gdo. Channel transconductance gdo, in turn, fluctuates according to the square root of Ids. Thus, as the input current from $I_{gen}$ 633 increases, the noise currents $I_{np}$, the noise current produced by current mirror 632, and $I_{nn}$, the noise current produced by current mirror 631, also increase.

The noise currents generated by gaussian noise generator 630 are Gaussian type noise such as thermal or shot noise. Therefore, mirror noise generators 620 and 640 effectively introduce noise waveforms proportional to the input currents $I_{n1}$ and $I_{n2}$, respectively, and gaussian noise generator 630 effectively introduces a controlled Gaussian noise waveforms whose standard deviation, or R.M.S., value is proportional to the square root of the amplitude of the current from $I_{gen}$ 633. Mirror noise generators 620 and 640 and gaussian noise generator 630 can be used individually or in combination as a source of noise into PLL 400.

Figure 7:
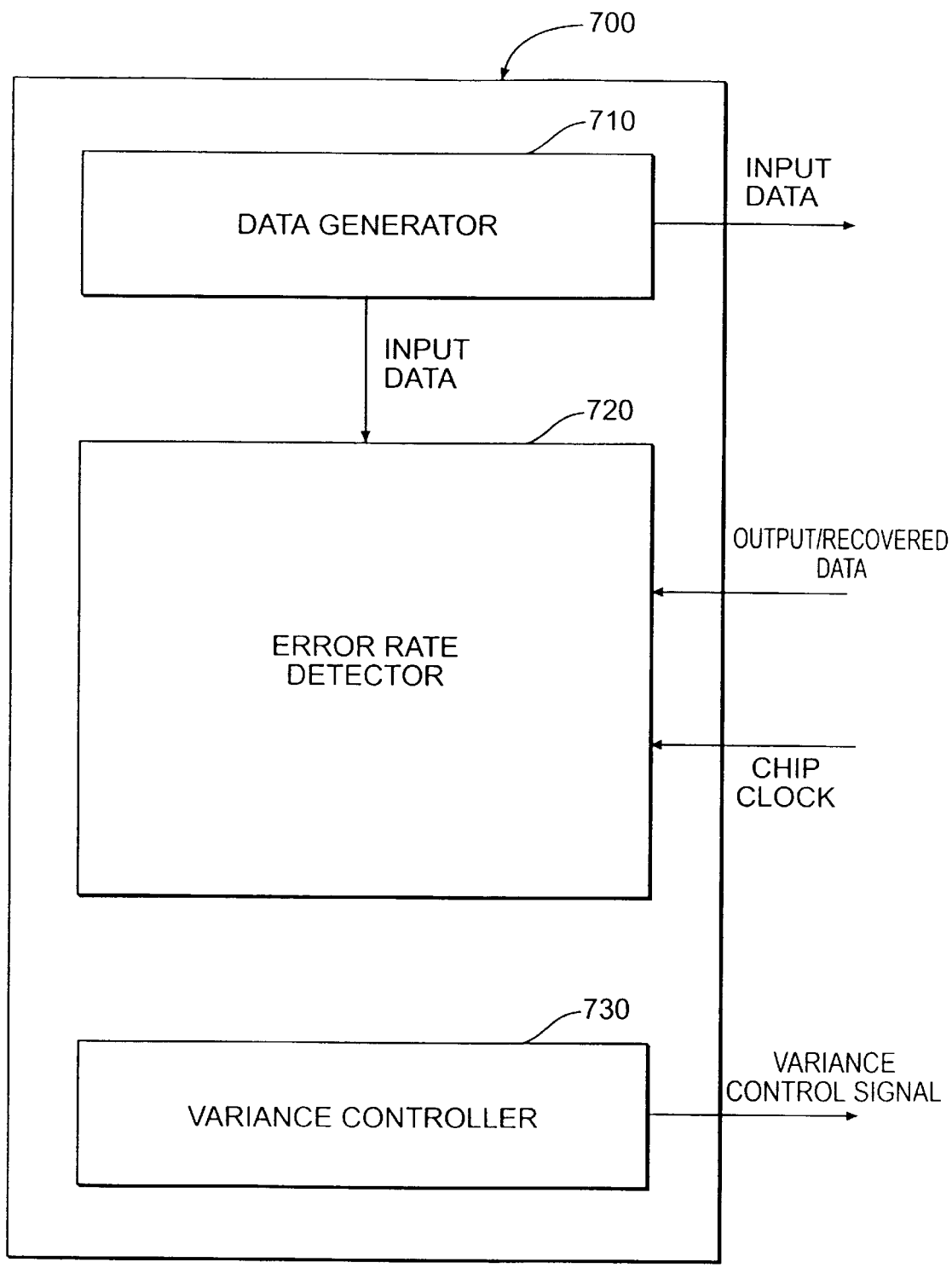
FIG. 7 is a block diagram of the external circuitry according to the present invention.

The circuitry in FIG. 3 could, for purposes of testing, connect to external circuitry. FIG. 7 shows a diagram of external circuitry 700 for such testing. External circuitry 700 preferably includes a data generator 710, an error rate detector 720, and a variance controller 730. Data generator 710 produces test input data signals that transmitter circuit 220 receives by setting switch 260. Error rate detector 720 also receives the input data from data generator 710 and receives either the output data or recovered data from chip 210.

Variance controller 730 generates a variance control signal to control the amount of variance introduced by variance circuit 360. As shown in FIG. 6, the variance control signal controls the characteristics, such as frequency and amplitude, of the currents received by current mirrors 620 and 640, and the characteristics of the noise signals generated by current generator 633 of noise generator 630. Consequently, the variance control signal controls the variance of the timing parameter of the transmit clock signal.

Figure 8:
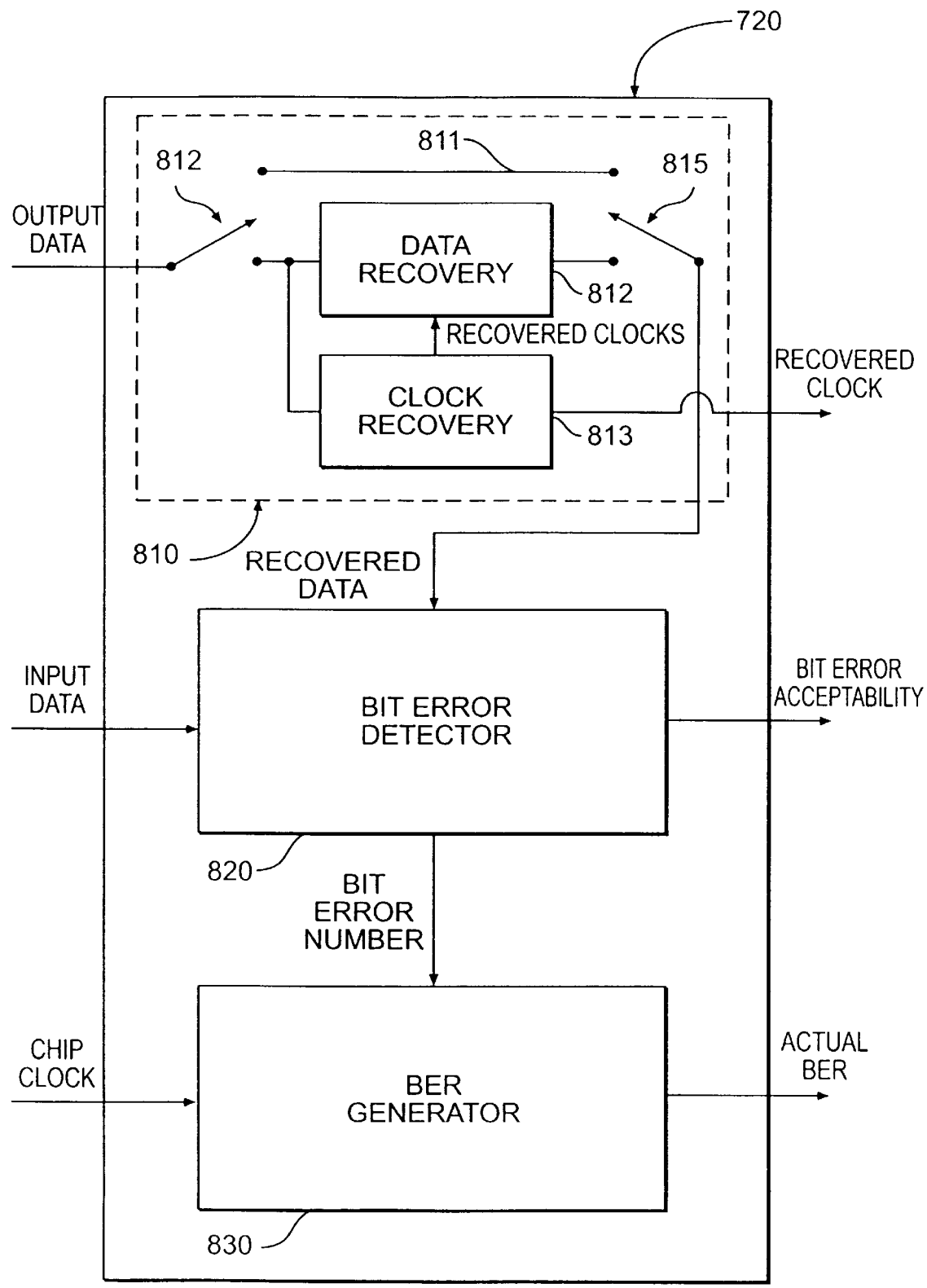
FIG. 8 is a block diagram of the error rate detector of FIG. 7

FIG. 8 shows a more detailed design of error rate detector 720. As shown, error rate detector includes a receiver circuit 810, a bit error detector 820, and a BER generator 830. Receiver circuit 810 also includes a bypass line 811, a data recovery circuit 812, a clock recovery circuit, and switches 814 and 815. Data recovery circuit 812 and clock recovery circuit 813 operate in the same fashion as data recovery circuit 331 and clock recovery circuit 332 of receiver circuit 230 described above.

Receiver circuit 810 receives the output data or recovered data from chip 210, and switch 814 selectively couples the received data either to bypass line 811 or to the inputs of data recovery circuit 812 and clock recovery circuit 813. Switch 815 selectively couples a recovered data signal from either bypass line 811 or the output of data recovery circuit 812 to bit error detector 820. Bit error detector 820 also receives the input data from data generator 710 and generates a bit error acceptability signal and a bit error number signal. BER generator 830 receives the bit error number signal and the chip clock signal from chip 210 to determine the actual bit error rate of chip 210.

The use of either bypass line 811 or the combination of data recovery circuit 812 and clock recovery circuit 813 depends upon the data received from chip 210. If receiver circuit 810 receives the output data from transmitter circuit 220, then switch 814 must be set to pass the output data through data recovery circuit 812 and clock recovery circuit 813. Output data received from transmitter circuit 220 still needs to be recovered as described above with reference to receiver circuit 330. However, when loop back circuit 250 couples the output data from transmitter circuit 220 to the input of receiver circuit 230, switch 270 will be set to couple the recovered data from data recovery circuit 331 to receiver circuit 810. Here, switch 814 couples the recovered data to bypass line 811 because the received data has already been recovered by receiver circuit 230. Switch 815 is set according to the setting of switch 814. Therefore, either receiver circuit 230 of chip 210 or receiver circuit 810 of error rate detector 720 can provide the necessary data recovery of the output data generated by transmitter circuit 220.

As already mentioned, bit error detector 820 receives both the recovered data from receiver circuit 810 and the input data from data generator 710. Ideally, the data patterns of both the recovered data and the input data would be identical. When the patterns are not identical, for example because of the jitter introduced into the output data by varying the timing parameter of the transmit clock signal, an error occurs.

Bit error detector 820 compares the data patterns of the recovered data and the input data to determine the number of bit errors. Due to the jitter introduced in the output data, the number of errors detected by bit error detector will be greater then when no jitter is introduced. The particular number of errors will depend on the qualities of chip 210 and the amount of variance determined by the variance control signal. After bit error detector 820 generates the bit error number signal, BER generator 830 receives the bit error number signal to determine the BER of chip 210. Bit error detector 820 also generates a bit error acceptability signal. This signal indicates whether the number of errors is above or below a predetermined threshold.

Determining the BER recognizes that the amount of variance of the timing parameter of the transmit clock signal produced by variance circuit 360 directly affects the bit error rate of chip 210. Thus, the bit error rate increases as the amount of noise increases, and the relationship between the BER and noise can be determined by recording the BER for each noise amount over a wide spectrum of noise amounts. Based on this relationship, the actual bit error rate of chip 210 can be determined by extrapolating the recorded bit error rates to a point with no noise. The actual bit error rate is the bit error rate without added noise, or in other words, when chip 210 is unstressed.

Before BER generator 830 can determine the actual BER of the chip, the fabrication system must determine the relationship between the amount of noise in the variance signal produced by variance circuit 360 and the effect on the BER of chip 210. In one method, the relationship between bit error rate and the amount of noise can be determined by trial and error. For instance, knowing in advance the actual bit error rate of a chip, variance circuit 360 would introduce varying amounts of noise and calculate the BER for each amount of noise according to the following equation:

$$BER=[(\text{number of errors})/T]/f_b, \quad (5)$$

where T represents the amount of time in seconds that errors are counted for the chip, and $f_b$ represents the bit rate of the chip in bits per second which corresponds to the rate of the chip clock. The calculated bit error rates for each noise amount would be recorded for later reference by BER generator 830 to determine the actual BER of the chip being tested.

As an example, assume that an acceptable bit error rate is $10^{-12}$ errors per bit and the known BER of a chip is exactly $10^{-12}$. During wafer sort, the amount of time available for testing each chip may be limited to three seconds. To get a fairly accurate calculation of BER, the number of errors must exceed a minimum amount such as 1000 errors. Based on equation (5) and given the number of errors is 1000, T is 3 seconds, and $f_b$ is, for example, $1\times10^9$ bits per second, the chip would have a BER of $3.33\times10^{-7}$ errors per bit. Therefore, variance circuit 360 must introduce enough noise to increase the BER of the chip with an actual BER of $10^{-12}$ to $3.33\times10^{-7}$ errors per bit. This noise amount would serve as the predetermined test noise for each chip of the wafer sort in order to determine the acceptability of each chip tested.

When testing chip 210 with the predetermined test noise, BER generator 830 can determine the actual BER of chip 210 by extrapolating the calculated BER (based on the number of errors, time, and bit rate) for chip 210 to the actual BER of chip 210. BER generator 830 performs the extrapolation based on the recorded relationship of calculated bit error rates of the chip with a known actual BER over a wide spectrum of noise amounts as described above. In addition, bit error detector 820 can determine the bit error acceptability signal by comparing the number of errors detected with the predetermined threshold which, for this example, is 1000 errors. Thus, fewer than 1000 errors would mean the chip is acceptable because, by extrapolation, the actual BER of chip 210 would be less than $10^{-12}$ errors per bit. The actual BER represented in the BER data signal would depend on an extrapolation according to the previously recorded relationship.

This invention therefore takes advantage of the ability to add a controlled amount of noise into a Tx/Rx chip to stress the chip, resulting in an increase in its bit error rate. By doing so, this invention reduces the amount of time required to test a chip to determine the acceptability of the chip and its actual BER.

It will be apparent to those skilled in the art that various modifications and variations can be made to the present invention without departing from the scope or spirit of the invention. Other embodiments of the invention will be apparent to those skilled in the art from consideration of the specification and practice of the invention disclosed herein. The specification and examples should be considered exemplary, with the true scope and spirit of the invention being indicated by the following claims.

What is claimed is:

1. An integrated circuit comprising:
   a clock generator generating clock signals;
   a variance circuit, connected to the clock generator, to controllably vary a timing parameter of the clock signals; and
   a transmitter circuit, connected to the clock generator, configured to generate output data using the clock signals, said output data for use in determining an error rate of the integrated circuit during testing of the integrated circuit.

2. The integrated circuit according to claim 1, further comprising:
   a receiver circuit to generate recovered data from the output data; and
   a loop back circuit, connected to the transmitter circuit and the receiver circuit, to selectively connect the output data from the transmitter circuit to the receiver circuit in response to a loop back control signal.

3. The integrated circuit according to claim 2, wherein the loop back circuit includes
   circuitry configured to connect the output data from the transmitter circuit to the receiver circuit during the testing of the integrated circuit.

4. A transmission system capable of determining a bit error rate of an integrated circuit comprising:
   test circuitry configured to generate test input data and test control signals and to evaluate recovered data wherein the integrated circuit is connected to the test circuitry and includes;
   a clock generator generating clock signals;
   a variance circuit, connected to the clock generator, to controllably vary a timing parameter of the clock signals in response to test control signals from the test circuitry; and
   a transmitter circuit, connected to the clock generator, to generate output data using the clock signals and the test input data.

5. The transmission system according to claim 4, wherein the integrated circuit further includes
   a receiver circuit to generate the recovered data from the output data.

6. The transmission system according to claim 4, wherein the clock generator includes
   a phase locked loop.

7. The transmission system according to claim 6, wherein the phase locked loop includes
   a phase detector;
   a loop filter connected to the phase detector;
   and a voltage controlled oscillator, producing the clock signal, connected in series with the phase detector and the loop filter to form a loop.

8. The transmission system according to claim 7, further including
   a first noise input port situated between the phase detector and the loop filter receiving a first variance signal generated by the variance circuit.

9. The transmission system according to claim 8, wherein the variance circuit includes
   a current mirror circuit with an output of the first variance signal.

10. The transmission system according to claim 8, wherein the variance circuit includes
   a noise generator having;
      a current generator generating an input current;
      a current mirror of a first type configured to generate a first noise current in response to the input current;
      a current mirror of a second type configured to generate a second noise current in response to the input current; and
      an output circuit to generate the first variance signal from the first and second noise currents.

11. The transmission system according to claim 10, wherein
   the current mirror of a first type includes a current mirror for sourcing current; and
   the current mirror of a second type includes a current mirror for sinking current.

12. The transmission system according to claim 7, further including
   a second noise input port situated between the loop filter and the voltage controlled oscillator receiving a second variance signal generated by the variance circuit.

13. The transmission system according to claim 12, wherein the variance circuit includes
   circuitry configured to generate the first variance signal.

14. The transmission system according to claim 12, wherein the variance circuit includes
   circuitry that generates the second variance signal.

15. The transmission system according to claim 12, wherein the variance circuit includes
   a current mirror circuit with an output of the second variance signal.

16. The transmission system according to claim 12, wherein the variance circuit includes
   a noise generator having;
      a current generator generating an input current;
      a current mirror of a first type configured to generate a first noise current in response to the input current;
      a current mirror of a second type configured to generate a second noise current in response to the input current; and
      an output circuit to generate the second variance signal from the first and second noise currents.

17. The transmission system according to claim 16, wherein
   the current mirror of a first type includes a current mirror for sourcing current; and
   the current mirror of a second type includes a current mirror for sinking current.

18. The transmission system according to claim 4, wherein the clock generator includes
   a delay locked loop.

19. The transmission system according to claim 4, wherein the clock generator includes
   a frequency locked loop.

20. The transmission system according to claim 4, wherein the test circuitry includes
   an error rate detector configured to determine the bit error rate of the integrated circuit from the test input data and one of the output data and the recovered data.

21. The transmission system according to claim 20, wherein the error rate detector includes
   a bit error detector; and
   a bit error rate generator configured to determine the bit error rate of the integrated circuit by extrapolating the number of bit errors detected by the bit error detector.

22. The transmission system according to claim 20, wherein the error rate detector includes
   a bit error detector; and
   a bit error rate generator configured to determine the bit error rate of the integrated circuit when the variance circuit does not vary a timing parameter of the clock signals by extrapolating from the number of bit errors detected by the bit error detector when the variance circuit does vary a timing parameter of the clock signals.

23. The transmission system according to claim 22, wherein the bit error generator includes
   circuitry configured to compare the calculated bit error rate to a predetermined threshold bit error rate to determine the acceptability of the integrated circuit.

24. The transmission system according to claim 20, wherein the test circuitry further includes
   a switching circuit for selectively connecting either the output data or the recovered data to the error rate detector.

25. The transmission system according to claim 24, wherein the error rate detector includes
   a recovery circuit for recovering data from the output data when the switching circuit connects the output data from the transmitter circuitry to the error rate detector.

26. A method for assisting in determining the bit error rate of an integrated circuit, comprising the steps of:
   producing clock signals in a clock generator in the integrated circuit;
   varying a timing parameter of the clock signal with a variance circuit in the integrated circuit; and
   generating output data in the integrated circuit using the clock signals, said output data for use in determining the bit error rate of the integrated circuit during testing of the integrated circuit.

27. The method according to claim 26, further comprising the steps of:
   selectively connecting the output data to a receiver circuit; and
   generating recovered data in the receiver circuit in the integrated circuit from the output data.

28. The method according to claim 27, wherein the step of selectively connecting includes the substep of
   connecting the output data to the receiver circuit during testing of the integrated circuit.

29. A method for determining a bit error rate of an integrated circuit in a transmission system comprising the steps of:
   generating test input data and test control signals;
   generating clock signals with a clock generator in the integrated circuit;
   varying a timing parameter of the clock signals with a variance circuit in the integrated circuit in response to test control signals;
   generating the output data in the integrated circuit using the clock signals and the test input data;
   generating recovered data with a receiver circuit in the integrated circuit from the output data; and
   evaluating the recovered data to determine the bit error rate.

30. The method according to claim 29, wherein the step of generating the clock signals includes the substep of generating the clock signals with a phase locked loop.

31. The method according to claim 30, wherein the step of varying the timing parameter includes the substeps of generating a variance signal with the variance circuit; and applying the variance signal to the phase locked loop.

32. The method according to claim 31, wherein the step of generating a variance signal includes the substep of using a current mirror to generate the variance signal.

33. The method according to claim 31, wherein the step of generating a variance signal includes the substeps of generating an input current;

generating a first noise current in a current mirror of a first type in response to the input current;

generating a second noise current in a current mirror of a second type in response to the input current;

combining the first and second noise currents to generate the variance signal.

34. The method according to claim 33, wherein the step of generating a first noise current includes the substep of sourcing the first noise current with the current mirror of the first type; and the step of generating a second noise current includes the substep of sinking the second noise current with the current mirror of the second type.

35. The method according to claim 29, wherein the step of generating the clock signals includes the substep of generating the clock signals with a delay locked loop.

36. The method according to claim 29, wherein the step of generating the clock signals includes the substep of generating the clock signals with a frequency locked loop.

37. The method according to claim 29, further comprising the step of determining the bit error rate using the test input data and one of the output data and the recovered data.

38. The method according to claim 37, wherein the step of determining the bit error rate includes the substeps of detecting the number of bit errors; and determining the bit error rate of the integrated circuit by extrapolating the number of bit errors detected.

39. The method according to claim 38, wherein the step of determining the bit error rate further includes the substep of comparing the calculated bit error rate to a predetermined threshold to determine the acceptability of the integrated circuit.

40. The method according to claim 37, wherein determining the bit error rate includes detecting the number of bit errors; and determining the bit error rate of the integrated circuit without variance of the timing parameter of the clock signals by extrapolating from the number of bit errors detected with variance of the timing parameter of the clock signals.

41. A transmission system including a phase locked loop for producing a jittered clock signal, comprising:

a phase detector receiving an input clock signal;

a loop filter connected to the phase detector; and a voltage controlled oscillator, producing the jittered clock signal, connected in series with the phase detector and the loop filter to form a loop, wherein a first noise input port is situated between the phase detector and the voltage controlled oscillator.

42. The transmission system according to claim 41, wherein the first noise input port is situated between the phase detector and the loop filter.

43. The transmission system according to claim 41, wherein the first noise input port is situated between the loop filter and the voltage controlled oscillator.

44. The transmission system according to claim 43, further including a second noise input port situated between the phase detector and the loop filter.

45. The transmission system according to claim 41, wherein the phase locked loop is provided on an integrated circuit and the jittered clock signal is used to test the integrated circuit.

* * * * *